(12) United States Patent
Kieviet et al.

(10) Patent No.: US 10,439,906 B2
(45) Date of Patent: *Oct. 8, 2019

(54) SYSTEMS AND METHODS FOR CONFIGURING A RESOURCE FOR NETWORK TRAFFIC ANALYSIS

(71) Applicant: Google LLC, Mountain View, CA (US)

(72) Inventors: Frank Geert Kieviet, Irvine, CA (US); Matthew Matyas, Lake Forest, CA (US); Robert Gardner, Irvine, CA (US); Martin Trieu, Costa Mesa, CA (US); David Wieser, Irvine, CA (US); Anthony Medeiros, Irvine, CA (US); Andres Albano, Laguna Hills, CA (US); Zohar Postelnicu, Sunnyvale, CA (US); Ajay Nainani, San Francisco, CA (US); Jens Trapp, Hamburg (DE)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/122,693

(22) Filed: Sep. 5, 2018

(65) Prior Publication Data

US 2019/0007283 A1 Jan. 3, 2019

Related U.S. Application Data

(63) Continuation of application No. 14/835,377, filed on Aug. 25, 2015, now Pat. No. 10,091,076.

(51) Int. Cl.
*G06F 15/173* (2006.01)
*H04L 12/26* (2006.01)
(Continued)

(52) U.S. Cl.
CPC .......... *H04L 43/045* (2013.01); *G06F 11/323* (2013.01); *G06F 11/3438* (2013.01);
(Continued)

(58) Field of Classification Search
None
See application file for complete search history.

(56) References Cited

U.S. PATENT DOCUMENTS

| 6,112,240 A | 8/2000 | Pogue et al. |
| 7,533,130 B2 | 5/2009 | Narayana et al. |

(Continued)

FOREIGN PATENT DOCUMENTS

| WO | WO-2004/0003701 | 1/2004 |
| WO | WO-2005/099225 | 10/2005 |

OTHER PUBLICATIONS

Final Office Action on U.S. Appl. No. 14/835,377 dated Jan. 22, 2018.

(Continued)

*Primary Examiner* — Mohamed Ibrahim
(74) *Attorney, Agent, or Firm* — Foley & Lardner LLP

(57) ABSTRACT

The present disclosure is directed to systems and methods of configuring a resource for network traffic analysis. An agent executed by a computing device receives an indication to record a browsing session. The agent records network activity data of the browsing session. The agent generates a data file with the recording. The agent transmits the data file and a request to generate a report to an analytics server. The analytics server receives the request and extracts the network activity data from the data file. The analytics server applies an event processing protocol to the network activity data. The analytics server generates a report and transmits the report to the client device for display.

20 Claims, 11 Drawing Sheets

(51) Int. Cl.
    *H04L 29/08*     (2006.01)
    *G06F 11/32*     (2006.01)
    *G06F 11/34*     (2006.01)
    *G06Q 10/06*     (2012.01)
    *H04L 12/24*     (2006.01)

(52) U.S. Cl.
    CPC ......... *G06F 11/3466* (2013.01); *G06Q 10/06* (2013.01); *G06Q 10/063* (2013.01); *H04L 41/0246* (2013.01); *H04L 43/00* (2013.01); *H04L 43/062* (2013.01); *H04L 43/10* (2013.01); *H04L 67/02* (2013.01); *H04L 67/06* (2013.01); *H04L 67/20* (2013.01)

(56) References Cited

U.S. PATENT DOCUMENTS

| | | | |
|---|---|---|---|
| 2002/0165954 | A1 | 11/2002 | Eshghi et al. |
| 2010/0251128 | A1* | 9/2010 | Cordasco ............... G06F 11/328 |
| | | | 715/736 |
| 2011/0022704 | A1* | 1/2011 | Duan ................. G06F 17/30899 |
| | | | 709/224 |
| 2012/0078708 | A1 | 3/2012 | Taylor et al. |
| 2012/0290708 | A1* | 11/2012 | Siemsgluess .......... G06Q 30/02 |
| | | | 709/224 |
| 2013/0031459 | A1* | 1/2013 | Khorashadi ....... G06F 17/30905 |
| | | | 715/234 |
| 2013/0304906 | A1* | 11/2013 | Yavilevich .............. H04L 67/22 |
| | | | 709/224 |

OTHER PUBLICATIONS

U.S. Office Action on U.S. Appl. No. 14/835,377 dated Jul. 13, 2017.
The International Preliminary Report for PCT application No. PCT/US2016/048121 dated Dec. 12, 2017.
U.S. Notice of Allowance on U.S. Appl. No. 14/835,377 dated Jun. 1, 2018.

* cited by examiner

SYSTEMS AND METHODS FOR CONFIGURING A RESOURCE FOR NETWORK TRAFFIC ANALYSIS

CROSS-REFERENCES TO RELATED APPLICATIONS

This application claim the benefit of priority under 35 U.S.C. § 120 as a continuation of U.S. patent application Ser. No. 14/835,377, filed Aug. 25, 2015, which is hereby incorporated by reference herein in its entirety.

BACKGROUND

In a networked environment such as the Internet, entities such as people or companies provide information for display on web pages or other interface by a computing device. The web pages can include text, video, or audio information provided by the entities via a web page server for display on the Internet. Additional content such as electronic advertisements can also be provided by third parties for display on the web pages together with the information provided by the entities. Thus, a person viewing a web page can access the information that is the subject of the web page, as well as selected third party advertisements that may or may not be related to the subject matter of the web page.

SUMMARY

The present disclosure is generally directed to systems and methods for configuring a resource for network traffic analysis. For example, a network traffic analysis tool may receive indications of network traffic. The indications can be triggered by tags embedded or placed in a webpage. The tool can use the indications to generate a report. However, due to the complexity and volume of tags on a website or associated with a browsing session, it may be challenging to configure the tags or confirm or validate that the tags are configured as intended.

At least one aspect is directed to a method of configuring a webpage for network traffic analysis. The method can include an agent of a web browser executed by a client device receiving an indication to record a browsing session. The method can include the agent recording, responsive to receiving the indication, network activity of the browsing session. The network activity can include events triggered by tags embedded in at least one of a plurality of web pages accessed during the browsing session. The method can include the agent generating a data file comprising the recording of the network activity. The method can include the client device transmitting, to an analytics server via a computer network, the data file and a request to generate a report using the data file. The method can include the analytics server extracting, responsive to the request, the network activity of the browsing session recorded in the data file. The method can include the analytics server applying an event processing protocol to the network activity of the browsing session extracted from the data file recorded by the agent of the web browser executed by the client device. The method can include the analytics server generating, responsive to application of the event processing protocol, a report. The method can include the analytics server transmitting, to the client device via the computer network, the report for display via a display device of the client device.

Another aspect is directed to a system to configure a webpage for network traffic analysis. The system can include an agent of a web browser executed by a client device. The system can include an analytics server having one or more processors. The agent can be configured to receive an indication to record a browsing session. The agent can record, responsive to the indication, network activity of the browsing session. The network activity can include events triggered by tags embedded on at least one of a plurality of web pages accessed during the browsing session. The agent can generate a data file comprising the recording of the network activity. The agent can transmit, to an analytics server via a computer network, the data file and a request to generate a report using the data file. The analytics server can be configured to extract, responsive to the request, the network activity of the browsing session recorded in the data file. The analytics server can apply an event processing protocol to the network activity of the browsing session. The analytics server can generate, responsive to application of the event processing protocol, a report. The analytics server can transmit, to the client device via the computer network, the report for display via a display device of the client device.

Another aspect is directed to a method of configuring a webpage for network traffic analysis. The method can include an analytics server receiving, from a client device via a computer network, a request to generate a simulated report using a data file recorded by an agent of a web browser executed by the client device. The data file can store network activity of a browsing session including events triggered by tags embedded on a plurality of web pages accessed by the client device during the browsing session. The method can include the analytics server extracting, responsive to the request, the network activity of the browsing session recorded in the data file. The method can include the analytics server applying an event processing protocol to the network activity of the browsing session extracted from the data file recorded by the agent of the web browser executed by the client device. The method can include the analytics server generating, responsive to application of the event processing protocol, a report. The method can include the analytics server transmitting, to the client device via the computer network, the report for display via a display device of the client device.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
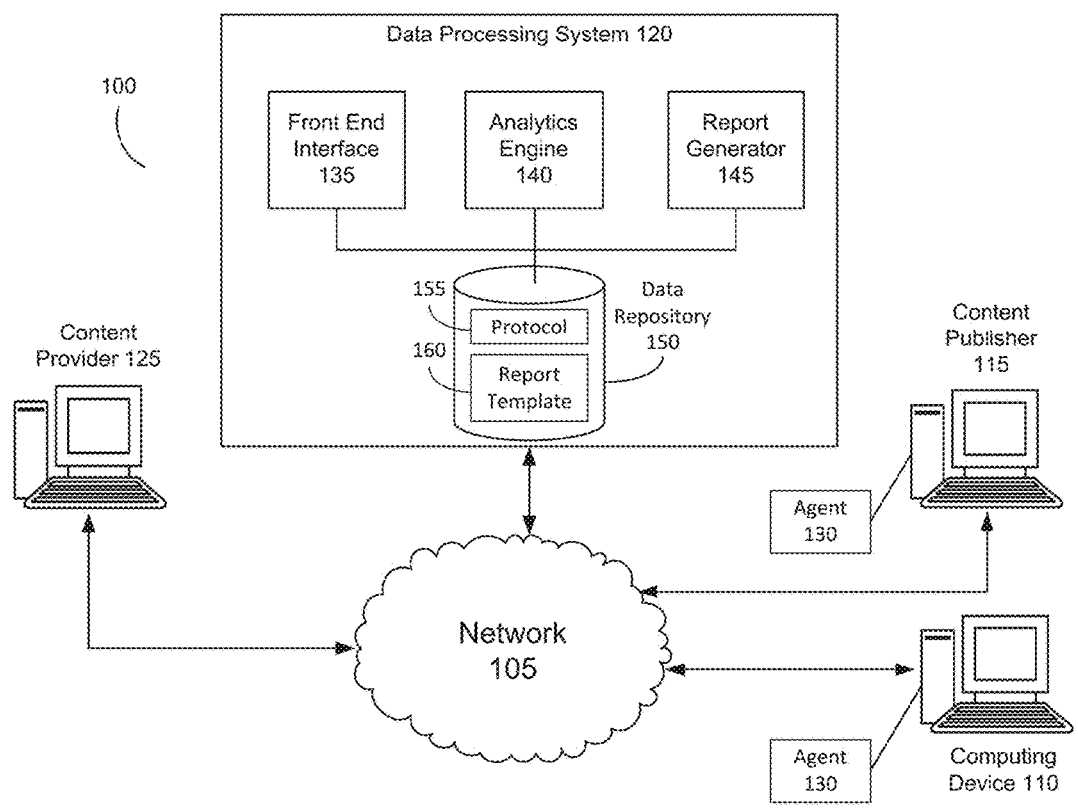
FIG. 1 depicts a system to configure a resource for network traffic analysis in accordance with an implementation.

Systems and methods described herein relate generally to configuring a resource (e.g., a webpage, website, online document, electronic document, or networked application) for network traffic analysis. The network traffic analysis can be performed by a network traffic analysis tool, server or analytics engine. The analytics engine can, for example, track browsing activity prior to a conversion to generate a report that indicates pages, content, or advertisements viewed or accessed by a user prior to making a purchase. A content provider, advertiser, online retailer or other website publisher can configure tags (e.g., HTML tags) or scripts (e.g., Java scripts) on, in, or with their webpage or advertisements to facilitate identification of details associated with a browsing session. When a user selects a link to purchase a product, for example, the HTML or Java tag or script can identify the event and store the event in a database for further processing, analytics, or reporting by the tool. However, due to the complexity and variability of configuring a webpage with these tags, it can be challenging for website developers to confirm that they have correctly tagged all the content on their webpage in order to produce useful and accurate analytics and reports.

The present solution allows a webpage developer to confirm that they have properly configured their webpage for useful analysis and reports. In one implementation, the method can include a web browser recording network activity including browsing activity or transactions. For example, the web developer can browse their webpage to test or validate the webpage. The web browser can be configured with an extension that records the browsing activity in a *.har file format.

The web browser can further be configured with a pre-analyzer that performs an initial or preliminary analysis. For example, the pre-analyzer can (1) determine that the code on the webpage was (or was not) correctly copied from a template; (2) check network traffic status; (3) check certain parameters, such as the web developer's account ID is properly included in the tag.

The web browser extension can forward the results of the pre-analyzer and the recording of the browsing activity to an analytics engine executed by a server. The server can analyze the recording of the browsing session to emulate aspects of the browsing session, such as hits, selections, conversions, etc. The server may be configured to generate a report that filters certain types of activity or information (e.g., filter out personally identifying information, or filter out selections that did not result in conversions, etc.). Thus, the analytics engine can use the recording to emulate the generation of a report, and provide the emulated report to the web developer via an interactive user interface. The user can review the report, and determine to make any adjustments or changes to the configuration of the web page, and confirm the configuration again.

In an illustrative example, a content provider configures their landing page with analytics tags or scripts. The content provider initiates an extension configured on their webpage to record browsing activity. The content provider selects their advertisement (e.g., via search advertisements displayed with a search results page), which re-directs them to the advertisement's landing page on the advertiser's website. The content provider proceeds to select items (e.g., products on sale) and add them to an online shopping cart. Prior to checking out the shopping cart, the content provider may proceed to browse the company's blogs, specials, etc.

The content provider can navigate back to the shopping cart and proceed to check out or purchase the items placed in the shopping cart. The process of checking out may include re-directing the content provider to a third-party payment process, after which the content provider can be re-directed to a "Thank you for your purchase" page on the content provider's website.

With this example, the content provider may expect an analytics engine to generate a report with certain characteristics or information. For example, the content provider would expect the analytics engine to generate a report with the following parameters or characteristics: a single visit/session (multiple visits indicate cross-domain tracking problems), paid search (absence of this may indicate a dropped unique tracking identifier), particular goals met, or one conversion recorded.

The analytics engine can receive a recording in a .har format of the content provider's browsing activity to generate a report analyzing the browsing activity. The content provider can compare the report with the expectations to verify that the content provider's webpage is configured properly.

Thus, the present solution improves configuration by allowing a content provider to immediately verify the configuration (or change in configuration) of their website, analyze a single user's journey as opposed to aggregated browsing activity, spans multiple platforms or web pages such as search and payment processors, works with websites that are in a staging environment and not yet pushed live (e.g., non-public websites still in development), and works behind a firewall or login wall, among other benefits. The present solution allows a user or website developer to record a "flow" through their website (and related sites). The recording contains page loads and network traffic (e.g. hits) sent to an analytics server. The recording can be done through a browser extension such as an agent. The recording can be sent to the analytics server, and the analytics server can present a report to the user with how this data was interpreted by the analytics engine, including problems found, and detailed information on what interactions were on which webpage.

FIG. 1 illustrates an example system 100 for configuring a resource for network traffic analysis. The system 100 can include network analysis infrastructure or content selection infrastructure. The system 100 can include one or more component or functionality of system 300. The system 100 can include a data processing system 120 communicating with one or more of a content provider 125, content publisher 115 or computing devices 110*a-n* (also referred to as computing device 110) via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be displayed on at least one computing device 110, such as a laptop, desktop, tablet, personal digital assistant, smart phone, or portable computers. For example, via the network 105 a user of the computing device 110 can access web pages provided by at least one web site operator or content publisher 115. In this example, a web browser of the computing device 110 can access a web server of the web site operator or content publisher 115 to retrieve a web page for display on a monitor of the computing device 110. The web site operator or content publisher 115 generally includes an entity that operates the web page. In one implementation, the web site operator or content publisher 115 includes at least one web page server that communicates with the network 105 to make the web page available to the computing device 110.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 120. The data processing system 120 can include at least one logic device such as a computing device having a processor to communicate via the network 105, for example with the computing device 110, the web site operator or content publisher computing device 115, and at least one content provider computing device 125. The data processing system 120 can be referred to as an analytics server 120. The computing device 110 can include at least one agent 130. The data processing system 120 can include at least one server, such as an analytics server. For example, the data processing system 120 can include a plurality of servers located in at least one data center. The data processing system 120 can include multiple, logically-grouped servers and facilitate distributed computing techniques. The logical group of servers may be referred to as a server farm or a machine farm. The servers may be geographically dispersed. A machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The data processing system 120 can include a network analysis tool or system having at least one server (e.g., an analytics server). The data processing system 120 can include a content placement system having at least one server. The data processing system 120 can also include at least one front end interface 135, at least one analytics engine 140, at least one report generator 145, and at least one data repository 150. The front end interface 135, analytics engine 140, and report generator 145 can each include at least one processing unit or other logic device such as programmable logic array engine, or module configured to communicate with the database repository or database 150. The front end interface 135, analytics engine 140, report generator 145, and data repository 150 can be separate components, a single component, or part of the data processing system 120. The system 100 and its components, such as a data processing system, may include hardware elements, such as one or more processors, logic devices, or circuits.

The data processing system 120 can obtain anonymous computer network activity information associated with a plurality of computing devices 110. A user of a computing device 110 can affirmatively authorize the data processing system 120 to obtain network activity information corresponding to the user's computing device 110. For example, the data processing system 120 can prompt the user of the computing device 110 for consent to obtain one or more types of network activity information, such as geographic location information. The identity of the user of the computing device 110 can remain anonymous and the computing device 110 may be associated with a unique identifier (e.g., a unique identifier for the user or the computing device provided by the data processing system or a user of the computing device). The data processing system can associate each observation with a corresponding unique identifier.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

The data processing system 120 can receive a request for content. The request may include a query such as a search query input into a search engine of the data processing system or other system. The input query may include text, characters, symbols, etc. The data processing system 120 may receive the input query from a computing device 110 via network 105. The input query may include audio (e.g., words spoken by a user of the computing device 110 and input into the search engine of the data processing system via network 105 and an interface). The request may include or be associated with information that facilitates selecting content responsive to the request. The information may include, e.g., contextual information about an electronic document, web page, electronic application, or organic, non-advertisement link on which the selected content is to be displayed. The data processing system 120 may provide an interface displaying input text boxes, buttons, drop downs, or other widgets through which a user of a client can select or otherwise indicate a category for the search.

Responsive to the search query or other request for content (e.g., electronic advertisements), the data processing system 120 (e.g., via data processing system 120) can identify, select or otherwise obtain content to be provided or presented via the computing device 110 making the request, or some other computing device 110 associated with the request for content. In some implementations, the data processing system 120 may identify, select, or otherwise obtain content without receiving a request for content. The content may include, e.g., text, characters, symbols, images, video, audio, or multimedia content. The content item may include an advertisement in the form of a sponsored link (e.g., provided by content providers) included by the search engine (e.g., via content selector) for display in the search engine results page. The request for content can include a request for an online advertisement, article, promotion, coupon, or product description. The data processing system 120 can receive the request from a computing device such as, e.g., computing device 110. For example, the data processing system 120 can receive the request via an application executing on the computing device 110, such as a mobile application executing on a mobile device (e.g., smart phone or tablet). In some cases, the data processing system 120 may not receive a separate request for content and, instead, select and provide the content (e.g., advertisement) responsive to the search query or with search results. In some instances, a web page may request content from the data processing system 120 responsive to a user of a mobile device 110 visiting the web page (e.g., via a mobile device 110).

The request for content can include information that facilitates content selection. For example, the data processing system 120 may request information from the computing device 110 to facilitate identifying content or content selection. The data processing system 120 may request or obtain information responsive to receiving a request for content from the computing device 110. The information may include information about displaying the content on the computing device 110 (e.g., a content slot size or position) or available resources of computing device 110 to display or otherwise manipulate the content.

The data processing system 120 may identify multiple content items (e.g., a first candidate content item and a second candidate content item) that are responsive to the request for content, or are otherwise candidates for display on an online document (e.g., a web page or a page of an online marketplace). The data processing system may initiate or utilize an online content item auction process to select one or more of the multiple content items for display on the online document. An auction system may determine two or more bids (e.g., monetary bids, point bids, token bids) for content items to be displayed in an online document. The auction system can run the bids through an auction process to determine one or more winning bids. Content items corresponding to the winning bids or highest ranking bids may be selected for display on or with the online document.

The data processing system 120 can include a content selector. The data processing system 120 can analyze, parse, or otherwise process subject matter of web page or the candidate content items to determine whether the subject matter of the candidate content items correspond to the web page. The data processing system 120 can identify, analyze, or recognize terms, characters, text, symbols, or images of the web page or candidate content items using an image processing technique, character recognition technique, or database lookup. The candidate content items may include metadata indicative of the subject matter of the candidate content items, in which case the content selector may process the metadata to determine whether the subject matter of the candidate content item corresponds to the web page.

Content providers may provide additional indicators when setting up a content campaign that includes content items. The content provider may provide information at the content campaign or content group level that the data processing system 120 may identify by performing a lookup using information about the candidate content item. For example, the candidate content item may include a unique identifier, which may map to a content group, content campaign, or content provider. The data processing system 120 may determine, based on information stored in data repository 150 about the content provider (e.g., advertiser), that the candidate content item is relevant or matches a request for a content item, subject matter provided via a web page with which the content item is to be displayed, or a search query input by a computing device. The data processing system 120 may select the content item based on network activity information, browsing history information, profile information etc. associated with the computing device 110 that initiated the request for the content item or the computing device 110 that is to display the content item.

In some cases, the data processing system 120 can perform an initial content selection process or technique to identify candidate content items. For example, the data processing system 120 can identify an initial (or first or baseline) set of candidate content items that are candidates for display with a webpage response. The data processing system 120 may identify the set of candidate content items based on content selection criteria established by a content provider, including, e.g., keywords, geographic information, profile information, etc. The data processing system 120 can also use information associated with the request for content, such as keywords or topics of the webpage with which the content item is to be displayed, information about the computing device, etc. For example, the data processing system 120 can identify candidate content items by filtering from a plurality of available content items to generate a subset of filtered candidate content items that are candidate content items for display with the webpage. The data processing system 120 can then initiate an online real-time auction with the candidate content items.

To facilitate improving a content selection campaign or performance of an online resource, for example, a content publisher 115 or content provider 125 can obtain a network traffic analysis report from an analytics server, such as data processing system 120. The data processing system 120 can receive indications of events triggered from network activity associated with a browsing session. For example, a content publisher 115 (via content publisher device 115 or computing device 110) can establish or configure tags or scripts on their resource (or website or webpage) that track viewing activity, selection activity, network activity, location information, or other information associated with a browsing session, and provide this information to an analytics engine to generate a report.

The system 100 can include an agent 130 that is designed and constructed to record network activity of a browsing session. The agent 130 can include an extension of a web browser. The agent 130 can be configured to be part of or an extension of a web browser. The agent 130 can be a separate application executing on a computing device 110. The computing device 110 can be associated with the content publisher 115 or an entity or administrator of the content publisher 115. For example, a web developer associated with the content publisher 115 may use a computing device 110 configured with an agent 130 to develop, configure, test, or validate one or more aspect of the resource. The resource can include, for example, a webpage, website, online document, executable application, widget, etc.

The agent 130 can a record a multi-page session ("flow") with respect to page loads and all interactions with an analytics server triggered via tags configured on the website or resource. The agent 130 can store the recorded data in a data file, and transmit the data to the data processing system 120. In some cases, the agent 130 can be further configured to receive a report generated by the data processing system 120, and display the report.

The agent 130 can record data triggered by tags configured on a resource. For example, the agent 130 can receive an indication or a request from a user of the computing device 110 to record network traffic. The agent 130 or web browser may generate or provide a graphical user interface that includes buttons or other user interface widgets that, when selected via an input mechanism (e.g., keyboard, mouse, touch interface, finger gesture, voice input, motion input, etc.) provides an indication to initiate recording.

The agent 130 can record hits, which can refer to an interaction that results in data being sent to the analytics server. Hit types can include page tracking hits, event tracking hits, and ecommerce hits. Each time the tracking code is triggered by a network activity (for example, web browser loads a page on a website or a screen in a mobile application), the agent 130 can record that activity. The agent 130 can package each interaction into a hit and store the hit in a data file. Examples of hit types include: page tracking hits, event tracking hits, ecommerce tracking hits, social interaction hits.

The agent 130 can use a file format such an HTTP archive ("HAR") format to record the network activity in the data file. Recording network activity can refer to capturing, identifying, or otherwise obtaining data associated with a browsing session. The data can include information on objects loaded into the web browser such as, e.g., content, third-party content items, advertisements, subject matter, images, documents, scripts, graphics rendering scripts, etc. The agent 130, upon capturing network activity data or browsing session data, can export the captured data to a file format such as HAR. The data file can include some or all objects loaded by the web browser during the browsing session, including a timestamp associated with the web browser loading the object. In some cases, the file format can include a JavaScript Object Notation ("JSON"). A JSON object can include or be formed from two data structures: a collection of name/value pairs and an ordered list of values. The unordered collection of name/value pairs can include, e.g., one or more of an object, record, struct, dictionary, hash table, keyed list, or associated array. The ordered list of value can include, e.g., an array, vector, list, or sequence.

The agent 130 can record, capture or obtain some or all HTTP and HTTPS browser communications, including, e.g., requests, responses, or full headers and body of packets. For example, the agent 130 can adjust a proxy configuration for the web browser to facilitate recording the browsing session. For example, the agent 130 may adjust the proxy configuration for port 7999 for HTTP and port 7997 for HTTPS to support recording the browsing session. The agent 130 may then receive an indication to terminate, end, or stop recording. Responsive to the indication to stop recording the browsing session, the agent 130 can stop tracking or obtaining network activity data. Responsive to the indication to stop recording, the agent 130 can further generate the data file in a file format, and store the data file in memory of the computing device. In some cases, the agent 130 can transmit the recorded data file to the data processing system 120.

The agent 130 can obtain information about objects loaded by the web browser during the browsing session. This information can include information associated with tags configured on one or more webpages accessed during the browsing session. For example, the resource can be configured with tags that facilitate event tracking. There may be various types of tags, such as page view tags that fire on each page of a website, event tags that track actions or events such as a button click, transaction tags that track an ecommerce transaction, social tags that track social interactions, timing tags that track loading speeds on a webpage, cross-domain tracking tags used to track separate, top-level domains as a single entity to combine data for multiple top-level domains together in the same report. For example, event tracking tags can be used to determine online interactions, such as how many times a button on a webpage was selected or clicked, whether a form was submitted, or a document was downloaded, for example. Tags can include website code that facilitates measuring network traffic and visitor behavior, understanding the impact of online advertising and social channels, remarketing and audience selection, testing and improving a website, etc. In some cases, the resource can be hardcoded with event tags using JavaScript (such as ga('send', 'event', 'category', 'action', 'label'). In some cases, event tags can include triggers based on predefined variables or on custom variables. Variables can include, e.g., Pages{Page URL, Page Hostname, Page Path, Referrer}; Utilities{event, container ID, container version, random number}; Errors{error message, error URL, error line, debug mode}; Clicks{click element, click classes, click ID, click target, click URL, click text}; Forms{form element, form classes, form ID, form target, form URL, form text}, History{new history fragment, old history fragment, new history state, old history state, history source}.

For example, an event tracking tag can be configured with event tracking parameters (or parameters) fields. Event can be a type of hit used to track user interactions with content. Examples of user interactions tracked with events can include downloads, mobile advertisement clicks, gadgets, multimedia or software platforms used for creating elements such as graphics, animation, browser games, or web applications, AJAX embedded elements, and video plays. The parameter fields can include, for example: event category, action, label, and value. The event tracking tag data structure can include a hierarchical configuration that facilitates organizing event data or click data. To tag can be configured with a tracking identifier ("ID") that is setup by entering a value (e.g., a numerical value, alphanumeric value, string, character, constant string variable, etc.).

The top level of the tag data structure hierarchy can include category or event category. This can be used to indicate where an event takes place. In an illustrative example, a website includes an "Overview" page with a button for "continue reading". In this example, a tag configured to track an interaction with the "continue reading" button can include a tag data structure with a top level field for category that identifies the category as "overview", which corresponds to the "overview" webpage on the website.

The second level in the tag data structure hierarchy can include the action. The action indicates or identifier the user action on the webpage. In this example, the user action corresponds to selecting or clicking on the "continue reading". Thus, the action field can be populated with the action "continue reading".

The third level in the tag data structure hierarchy can include the label field. The label can provide additional information about what was clicked. In this example, label field can collect an outbound URL because the outbound URL can have an article title in it. For example, a built-in variable {{Click URL}} can collect this information.

The fourth level in the tag data structure can include a value field. The value field can include a numeric value corresponding to the action. It may be optional to include a value field.

The fifth level in the tag data structure can include a true/false toggle field. The true/false field indicates whether a non-interaction event occurred. A non-interaction event may refer to a bounce-rate. For example, a bounce-rate may refer to a number or percentage of visitors to a particular website that navigate away from the website after viewing only one webpage of the website. For example, if a user selects or clicks on a button or link that does not create a new pageview to impact bounce-rate, the toggle field can be set to True. In the above example, because the 'continue reading' button may lead to another webpage on the same website, the tag value of this parameter can be set to False, thereby not increasing the bounce-rate.

Upon assigning values to the tag data structure, the tag can be further configured with triggering parameters. Triggering parameters can refer to what fires the tag or triggers the tag to record an event or track or event or perform some action or store some information. For example, the tag can be configured to trigger responsive to a "click". There may be multiple click types, such as a link click trigger or a click trigger. A link click trigger can be used when there is any type of anchor tag <a> to attach to (e.g. <a href="#"> Link </a>). A click trigger can be used for any other element like <div> or <img> tags (e.g. a button: <div class="button"> Button</div>). In some cases, there may be a non-anchor element within an anchor tag (e.g. <a href="#"><img class="image" src="#"></a>), in which case a developer may determine what to use to identify whether a tag should fire or not and which element the tag is attached to. For example, if the tag is a Click URL (i.e. the anchor's href), then the tag can be configured with a link click triggering parameter. If the tag includes a class or some other attribute of the child element, then the trigger parameter can be configured with a click trigger. Thus, a click trigger type can provide the information about the lowest-level element clicked on, whereas a link click trigger type can provide information about the anchor tag being clicked upon (even if there's a lower-level child element). Triggering parameters may further include, e.g., where to enable the trigger (such as trigger to fire on every page via "URL matches Regex.*").

Triggering parameters may further include a condition on which to 'fire'. The fire condition can function as a filter that controls or indicates when to fire the trigger. The tag can be configured with a fire condition that fires on all clicks or on some clicks. For example, if the fire on condition is set to 'some clicks', additional fields can be used to define, specific, control, or filter the firing conditions.

Thus, by configuring a tag data structure on a webpage, a computing device can transmit data to an analytics server that indicates what articles visitors clicked into from the 'Continue Reading' buttons on their overview page. For example, the configured tag can include the following tag data structure: track_type{event}, category {overview}, action{continue reading}, label{click URL}, fire{click}. The agent 130 can record the data that may be otherwise transmitted to an analytics server. The agent 130 can, responsive to receiving an indication to start recording a browsing session, intercept the tags that fire responsive to a trigger condition, along with any other HTTP object, and store them in a data file on the computing device.

Upon recording, generating, creating, storing, or updating the data file with the network activity data of the browsing session, the computing device 110 can provide the data file to a data processing system 120 for further processing. In some implementations, the data processing system 120 can include a front end interface 135 designed and constructed to receive the data file via the network 105 from the computing device 110 or agent 130 thereof. The agent 130, responsive to termination of the recording, can be preconfigured to access the front end interface 135 provided by data processing system 120. In some cases, a user of the computing device 110 may input a web address or uniform resource locator ("URL") into the web browser to access the front end interface 135.

The data processing system 120 (or analytics server 120), can receive (e.g., via the front end interface 135) data or information about the browsing session recorded or captured by the agent 130. For example, the front end interface 135 can receive the data file via a data upload from the computing device 110. In some examples, the data processing system 120 can receive the recorded data via a text input box configured on the front end interface 135. For example, the data processing system 120 can provide a text input box. The agent 130 can display the recorded network activity data (e.g., in JSON). A user of computing device can copy the text output displayed by the agent 130 (e.g., via a copy functionality of computing device 110), and paste the text into the input text box provided by front end interface 135.

The front end interface 135 can be configured with security protocols, such as Authentication, Authorization, and Accounting protocols or mechanisms for controlling access to the data processing system 120. For example, the front end 135 can provide a login prompt for display on computing device 110. The login prompt can include request for credentials such as username and password. The front end interface 135 can be configured with multifactor authentication that can require more than one method of authentication from independent categories of credentials to verify the user's identity for the login. Login credentials or factors can include, for example, one or more of a password, pin, secret questions, security token, disconnected tokens, connected tokens, biometric (e.g., fingerprint or retina scanners or voice recognition). In some implementations, the front end 135 can request the content provider or content publisher to input an identifier associated with a content campaign.

Figure 4:
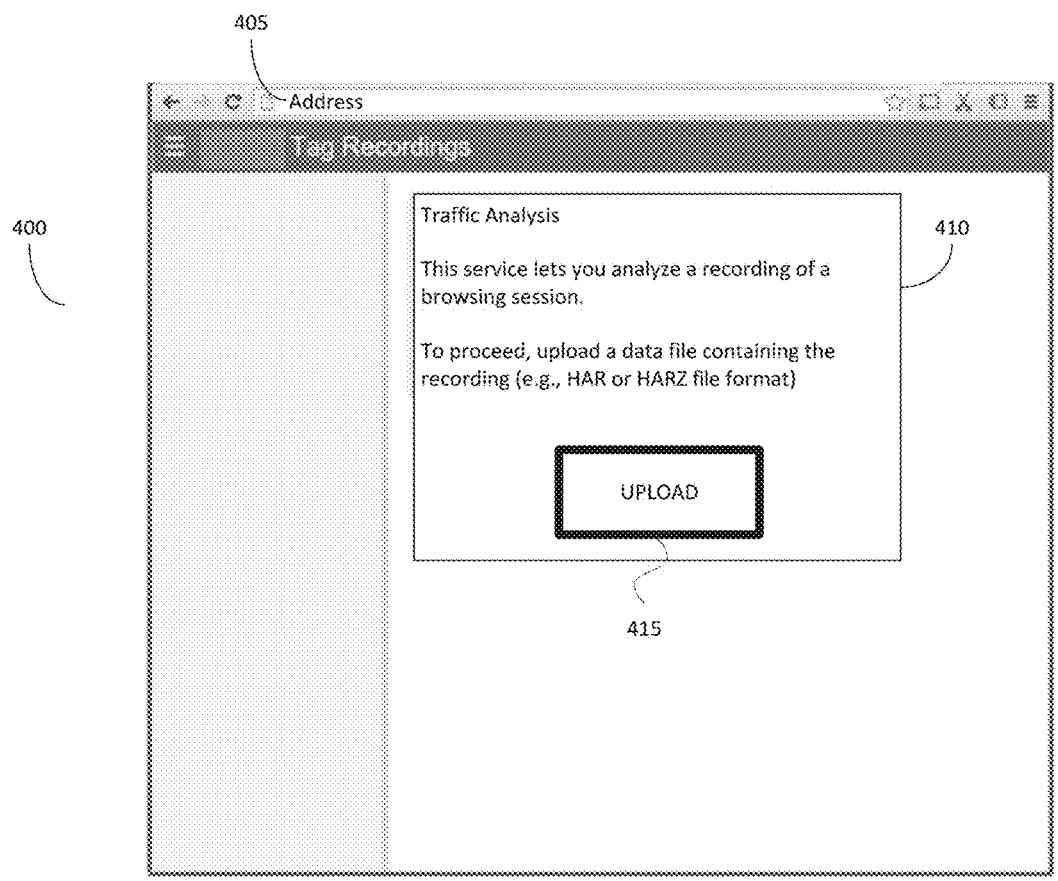
FIG. 4 depicts a user interface for receiving recorded network activity in accordance with an implementation.

FIG. 4 illustrates an example graphical user interface 400 provided by data processing system 120 via the front end interface 135. The interface 400 can be provided via a web browser or a tab of a web browser. The front end interface 135 can be accessed by inputting or providing an address 405 in an address bar of the web browser. The agent 130 may automatically direct the web browser to this address, or a user may input the address. The front end interface 135, responsive to receiving a request to perform traffic analysis from the agent 130 or computing device 110, can provide a graphical user interface 410. The interface 410 can include text describing the service or providing instructions. The interface 410 can include an upload button 415. Upon selecting the upload button 415 (or responsive to receiving an indication to upload by the front end interface 135), the data processing system 120 can provide a prompt or dialog box or file directory configured to allow the user to point the front end interface 135 to a location on the computing device 110 storing the data file recorded by the agent 130.

The client device 110 can transmit the data file to the data processing system 120 via network 105. In some implementations, the client device 110 may compress the data file prior to transmission over network 105. Compressing the data file may reduce the amount of bandwidth used to transmit the data file, decrease the amount of time needed to transfer the data file, or reduce network latency. In some implementations, uploading or transmitting the file may correspond to providing a request to generate a report using the data file. In some cases, the data processing system 120 may receive, via network 105 from computing device 110, a separate request to generate a report using the data file.

In some implementations, the front end 135 can be configured to perform initial processing or analysis of the network activity data. The front end interface 135 can include an extractor tool to extract the recorded data file. For example, the front end interface 135 may decompress the data file. The front end interface 135 may further analyze the decompressed data. For example, the front end interface 135 can parse or analyze the network activity data to diagnose one or more errors associated a tag configuration, and generate, create, or render a report providing the diagnosis.

The front end interface 135, responsive to receiving the data file or performing one or more initial process on the data, can provide the data file or initially processed data to an analytics engine 140. The data processing system 120 can include an analytics engine 140 designed and constructed to apply an event processing protocol (e.g., protocol 155) to the network activity of the browsing session extracted from the data file recorded by the agent of the web browser executed by the client device. The data repository 150 can store protocols 155 such as event processing protocols. The analytics engine 140 can retrieve an event processing protocol from data repository 150. The event protocol processing protocol may be a predetermined protocol (e.g., by an administrator of the data processing system 120), or provided by the user (e.g., the content publisher or content provider). The protocol may be linked to an account associated with the user. The event processing protocol (e.g., protocol 155) can include rules, logic, heuristic techniques, filters or other processing techniques to parse events or hits triggered by tags and stored in the data file. The analytics engine 140 can further obtain configuration information of properties and views, which may be filtered based on the level of access of the user. The analytics engine 140 can use this information to identify a browsing session of the data file.

In some implementations, the analytics engine 140 includes a sessionizer that is configured to identify one or more sessions in the data file. An event processing protocol can include a sessionization protocol that is configured to identify one or more sessions in the data file. For example, an event processing protocol applied to network activity to determine a session can analyze time periods of network activity and inactivity in relations to a website to identify one or more sessions. The sessionization protocol may identify a period of time there is network activity (e.g., a user is active) on a website or in an application. If there is network inactivity for a predetermined time interval (e.g., 20 minutes, 25 minutes, 30 minutes, 1 hour, or more), the data processing system 120 can attribute any future activity to a new, second session different from the previous, first session. In some cases, the data processing system 120 can determine that users that leave the website and return within the predetermined time are counted as part of the original, first session.

The analytics engine 140 can obtain the parsed hits or events and apply one or more sessionization filters that divide the events or hits recorded in the data file into sessions. For example, the recorded data file may include a plurality of events. One or more of the events can be triggered by tags from the browsing session. As tags are triggered, they can provide information corresponding to the tag. For example, this may include a timestamp, a source URL, a destination URL, etc. The analytics engine 140 can analyze the information associated with triggered tags to identify one or more sessions.

The data processing system 120 can apply the event processing protocol to determine a conversion. For example, the data processing system 120 can identify, in the data file, a first recorded event triggered from a tag associated with an advertisement content item. The tag can be triggered responsive to the user clicking on the advertisement during the browsing session recorded by the agent 130. The data processing system 120 can identify a second tag triggered during the same browsing session that corresponds to a landing page for the advertisement. The data processing system 120 can identify a third tag associated with an "add to cart" button associated with a product on the landing page or the website domain associated with the landing page. The third tag can be a click tag or a link click tag. The data processing system 120 can identify a fourth tag triggered during the same browsing session that corresponds to a checkout webpage. The fourth tag may correspond to a page tag that indicates that a user visited the checkout page. The data processing system 120 can identify a fifth tag corresponding to a "checkout" button on the checkout webpage. This "checkout" button may redirect the user or web browser to a third-party payment processor website. The data processing system 120 can identify, from an HTTP packet, that the web browser was directed to the third-party payment processor webpage. In some cases, the third-party payment processor webpage may not include embedded tags configured by the user. In some cases, the third-party payment processor webpage may include embedded tags. Upon completing the transaction, the third-party payment processor webpage may redirect the web browser to a confirmation page associated with the main website. The data processing system 120 can identify, in the data file, a sixth tag triggered responsive to the user returning to the confirmation webpage of the original website corresponding to the landing page of the selected advertisement. Thus, the data processing system 120 can identify, by applying this exemplary event processing protocol to the network activity recorded in the data file, a conversion and a transaction via a third-party payment processor.

The data processing system 120 can include a report generator 145 designed and constructed to generate, create or otherwise provide a report. In some implementations, the report generator 145 can provide an interactive or dynamic report via the front end interface 135. In some implementations, the report generator 145 can provide the report for display on computing device 110 via network 105. The report can include alerts, diagnosis information, event information, tag configuration information, conversion information, transaction information, network activity information, status information, number of browsing sessions, visited webpages, number of clicks, number of events, number of hits, etc.

Figure 5A:
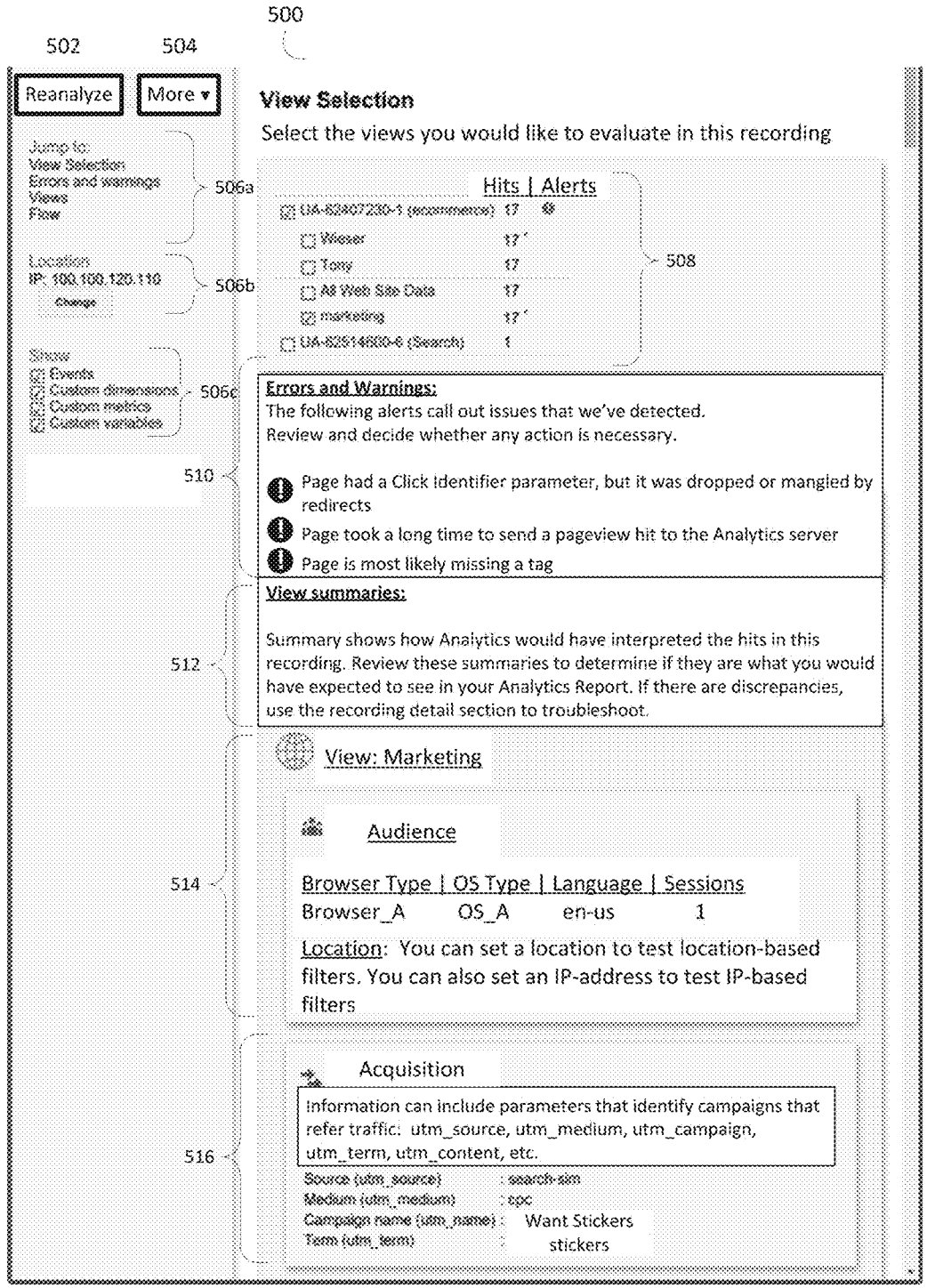
FIG. 5A depicts a user interface for a report generated with recorded network activity in accordance with an implementation.

The report generator 145 can include an Application Programming Interface with a set of protocols and tools designed to extract data from the analytics engine 140 account into custom scripts or programs for more automated and efficient reporting and analysis. In some implementations, the report generator 145 can retrieve a report template 160 from data repository 150. The report template 160 can include various report configurations, headings, sections, formulates, graphs, charts, tables, etc. that may facilitate conveying results of the analytics engine 140 to a user. FIG. 5A illustrates a report 500 generated by report generator 145 and provided by front end interface 135 for display on the computing device 110. The report 500 includes various sections with section headings. The report 500 includes interactive buttons, input boxes, check boxes, drop down menus, or other widgets. The report 500 includes a reanalyze button 502. The reanalyze button 502 can send the data file back to the analytics engine 140 to be analyzed again. For example, the reanalyze button 502 can instruct the analytics engine 140 to reanalyze the data file. A user may want re-analyze the data file after making a change to an event processing protocol (e.g., protocol 155), for example. The report 500 can include a more button 504 with additional functionalities such as download recording, import new recording, or print report. The report can provide, in an iframe, sections 506a-c. For example, section 506a can include links to jump to other views or sections such as view selection, errors and warnings section, views, and flow. Section 506b can identify information such as an IP address corresponding to a location associated with the analysis. Section 506c can include filters or toggle boxes to toggle what is displayed in the report 500.

The report generator 145 can generate the report 500 with one or more sections. A first section 508 can include an overview of the analysis. This overview 508 can include a table of properties encountered in the data file (e.g., HAR file). For each property, the report can show a number of hits (e.g., pageviews, events, other). Pageview can refer to an instance of a page being loaded (or reloaded) in a web browser. Pageviews can be a metric defined as the total number of pages viewed. The report can further indicate, via an icon, whether there were any alerts. The report can further show errors and warnings in section 510. For example, the errors and warnings section 510 can include a table showing an overview of errors and warning in selected properties and views. Example errors or warnings can include: page had a click identifier parameter, but it was dropped or mangled by redirects; page took a long time to send a pageview hit to the analytics server; page is most likely missing a tag. The report generator 145, analytics engine 140, or front end 135 can identify one or more errors or warnings.

The report 500 can include a filter. The filter can be a configuration setting that allows for adding, removing, or modifying data during processing before it is displayed in your reports. The data processing system 120 can use the view filters to limit and modify the traffic data that is included in a view. For example, the data processing system 120 can use filters to exclude traffic from particular IP addresses, focus on a specific subdomain or directory, or convert dynamic page URLs into readable text strings.

The report generator 145 can generate the report 500 to include one or more reporting views. A view or reporting view can be a subset of an analytics account property that can have its own unique configuration settings stored in a report template 160. The report template 160 can include multiple views for a single property and can configure each view to show a different subset of data for the property. The report may contain long strings, e.g. hit URLs that can be collapsed by default and adorned with an icon that when clicked, expands the collapsed string to its full content. The report can include a setting to expand collapsed strings.

The report generator 145 can generate the report 500 with a view summaries section 512. The view summaries section 512 can show how the data processing system 120 would interpret the hits recorded in the data file. The summaries can be used to determine whether the data processing system 120 accurately analyzed the browsing session. If there are any discrepancies (e.g., the data processing system 120 failed to identify a conversion even though the user purchased a product), then the report can provide additional details to facilitate trouble shooting the processing protocol or the tags configured on the website.

The report can include a different section for each view. Types of view sections can include, for example, marketing, audience, acquisition, behavior, conversions, flow, etc. Each view section can include, e.g., a site content table that shows a number of page views, events, and sessions for each URL as recorded in the view. The view section can include session data with one or more containers including, e.g., referrer, entry URL, exit URL, campaign, conversions (a table), custom dimensions (session scope) (a table), custom variables (session scope) (a table), number of hits, events, etc. Events can further include a table with columns such as Category, Action, Label, Count, or Sum. Actions for the same category can be rolled up in one row. This row can be expanded showing all the permutations of actions and label for that category.

The report generator 145 can generate the report 500 with an audience section 514 that shows audience information. The report generator 145 can provide the audience information with a table that includes fields for browser type, operating system type, language, and number of session, for example. In this example report, the browser type is Browser_A, the operating system type is OS_A, the language is United States English, and the number of sessions identified by the analytics engine 140 is 1. The audience section 514 can also include location information. Since this is a test, the front end interface 135 can be configured with a location input where a user can provide location information for the browsing session. Location information can be provided in the form of an address, city, state, country, latitude longitude, map cell, internet protocol address, etc.

The report generator 145 can generate the report 500 with an acquisition section 516 that shows information about parameters that identify campaigns that refer traffic. Parameters can include, e.g., source, medium, campaign, term, content, etc. The source can refer to the source of the traffic, such as a search engine or a domain. The medium can refer to a general category of the source, such as organic search, cost-per-click paid search ("CPC"), web referral ("referral"). In this example, the source may be "search-sim" which indicates a simulated search engine. The medium can be cpc or cost-per-click paid search. The campaign name is "want stickers" and the term is "stickers".

Figure 5B:
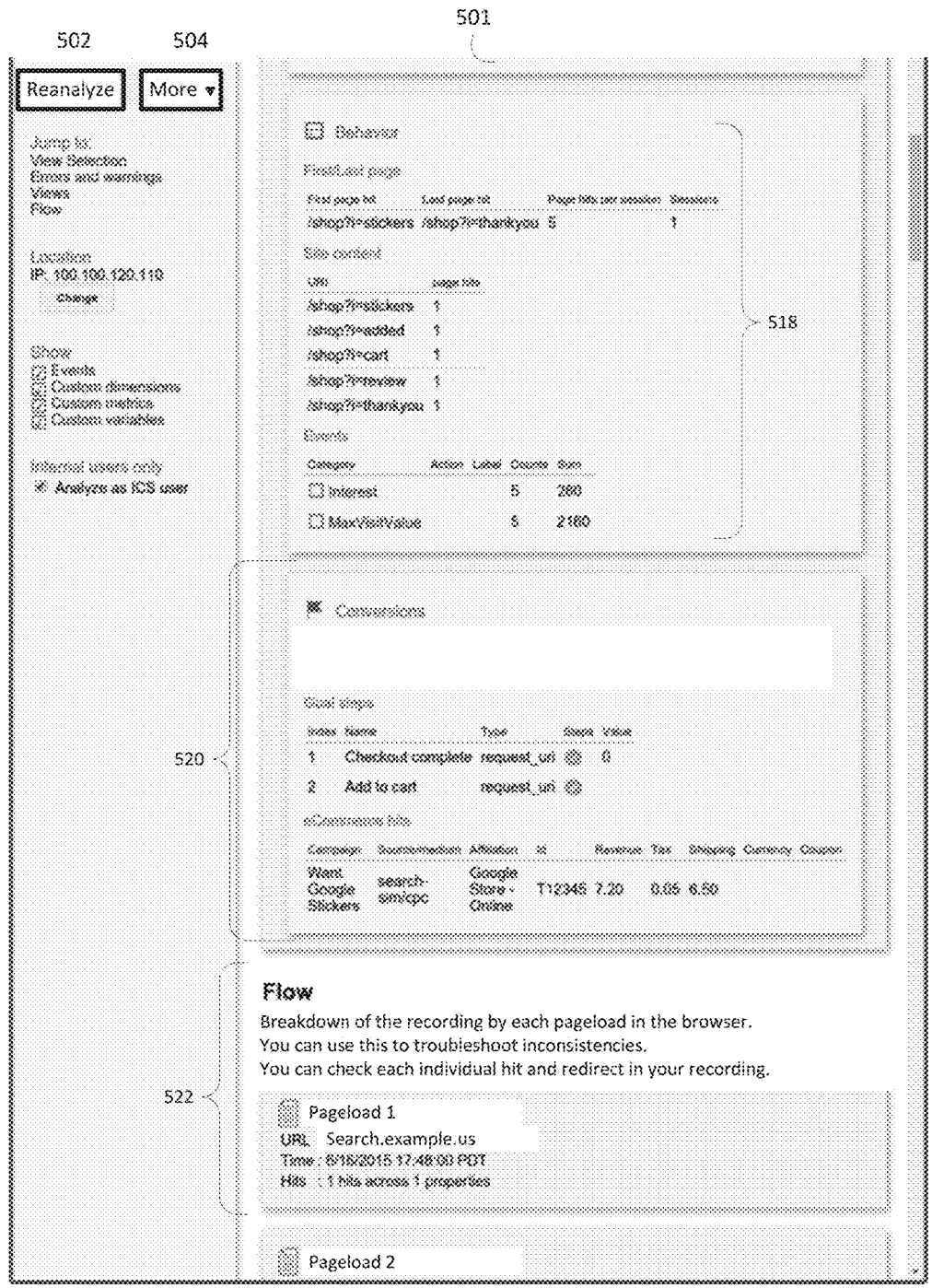
FIG. 5B depicts a user interface for a report generated with recorded network activity in accordance with an implementation.

FIG. 5B illustrates report 501 generated by report generator 145. The report 501 can be an extension or a part of report 500. For example, scrolling down report 500 can lead to report 501. Report 501 includes information on behavior 518, conversions 520, and flow 522. The behavior section 518 can include information about the first page hit, last page hit, number of page hits per sessions, and number of sessions in the recorded network activity data file. The Behavior section 518 can further identify site content, such as stickers, added, cart, review, and thank you, and a corresponding number of page hits for each content. The behavior section can further identify events and categorize the events as follows: interest; maxvisitvalue. The report generator 145 can further provide, for each event, an action, label, counts, and sum. In this example, the counts for each event is 5 and the sum is 260 for interest and 2160 for maxvisitvalue. A category can be a name provided via the report template as a way to group objects for tracking. The same category name can be used multiple times over related user interface elements that are to be grouped under a given category.

The report generator 145 can generate the conversions section 520 to include information about conversions. A conversion can refer to achieving one or more goals or steps. In this example, goals include completing a checkout and adding to cart. The report generator 145 can generate a journey or flow section 522 that breaks down the recording by each pageload in the web browser. Each pageload can include information about the URL, time, and number of hits per property. The report generator 145 can frame each sequence of page loads in a different container. Each pageload can include a container for the selected properties. Below a property are additional containers for the selected views belonging to that property. A property container can be adorned with a "tag" icon. A view container can be adorned with a view icon.

The flow section 522 can include detailed information about pages being loaded, hits being fired, etc. This section 522 can be used to drill down into problems or for troubleshooting. This section lists each separate page load and for each page load it shows: the page load information (redirects, times, etc); the hit information (hit URL, etc); result of hit parsing; or view information: how a View stores the hit information.

Figure 5C:
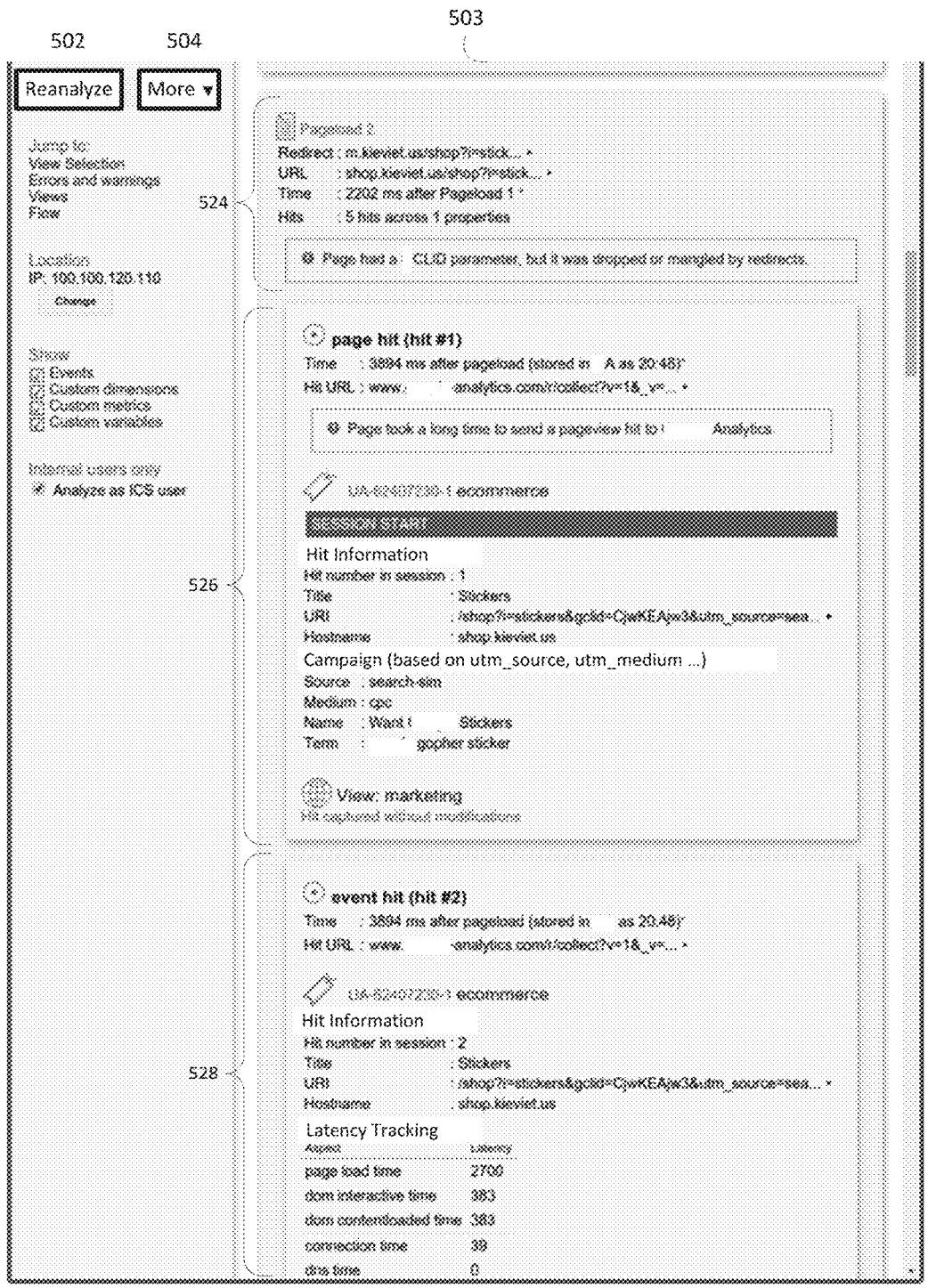
FIG. 5C depicts a user interface for a report generated with recorded network activity in accordance with an implementation.

FIG. 5C illustrates report 503 generated by report generator 145. The report 503 can be an extension or a part of report 500 or 501. For example, scrolling down report 500 or 501 can display report 503. Report 503 includes information on pageload 2 524, page hit 526, and event hit 528. The pageload 2 section includes redirect information (e.g., from where the pageload was directed, or where a the pageload 2 directs the browser); URL, time, and number of hits per property. The section 524 can further identify errors or warnings, such as a dropped tracking identifier. Section 526 of the report 503 identifies page hit information. Page hit information can indicate the hit number (e.g., hit #1), the time of the hit (e.g., 3894 milliseconds after page load), hit URL, errors (e.g., page took too long to send a page view hit to the analytics server), session start hit information, title (e.g., stickers), URI, hostname, campaign, etc. The report can include section 528 for an event hit (e.g., hit #2), which may identify a time (e.g., 3894 ms after pageload), hit URL, tracking identifier (e.g., UA-62407230-1), event type (e.g., ecommerce), hit information (e.g., hit number in session, title, URI, hostname). Report section 528 may further include latency tracking information in a table form, such as page load time (e.g., 2700 ms), document object model ("dom") interactive time (e.g., 383 ms), dom contentloaded time (e.g., 383 ms), connection time (e.g., 39 ms), and dns time (e.g., 0).

Figure 5D:
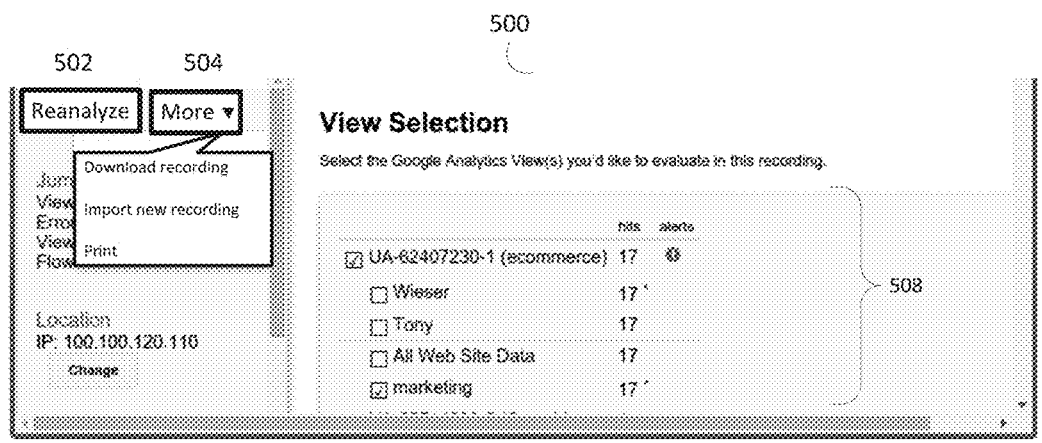
FIG. 5D depicts a user interface for a report generated with recorded network activity in accordance with an implementation.

FIG. 5D illustrates the report 500 with the "more" drop-down button 504 expanded. The report generator 145 or front end interface 135 can provide interactive report features and additional functionality such as allow a user to download the recording, import a new recording, or print the report (or the recording) by selection via the more button 504. Additional features or function can include, e.g., reanalyze, save input—this sends the input to the server which replies with a zipped up version of the request HAR, or new—this brings the user to the screen with the upload/paste options. The data processing system 120 or agent 130 can print the report or convert the HTML or Javascript rendered report to a post script display format to facilitate transmitting the report to other computing devices via network 105.

Figure 2:
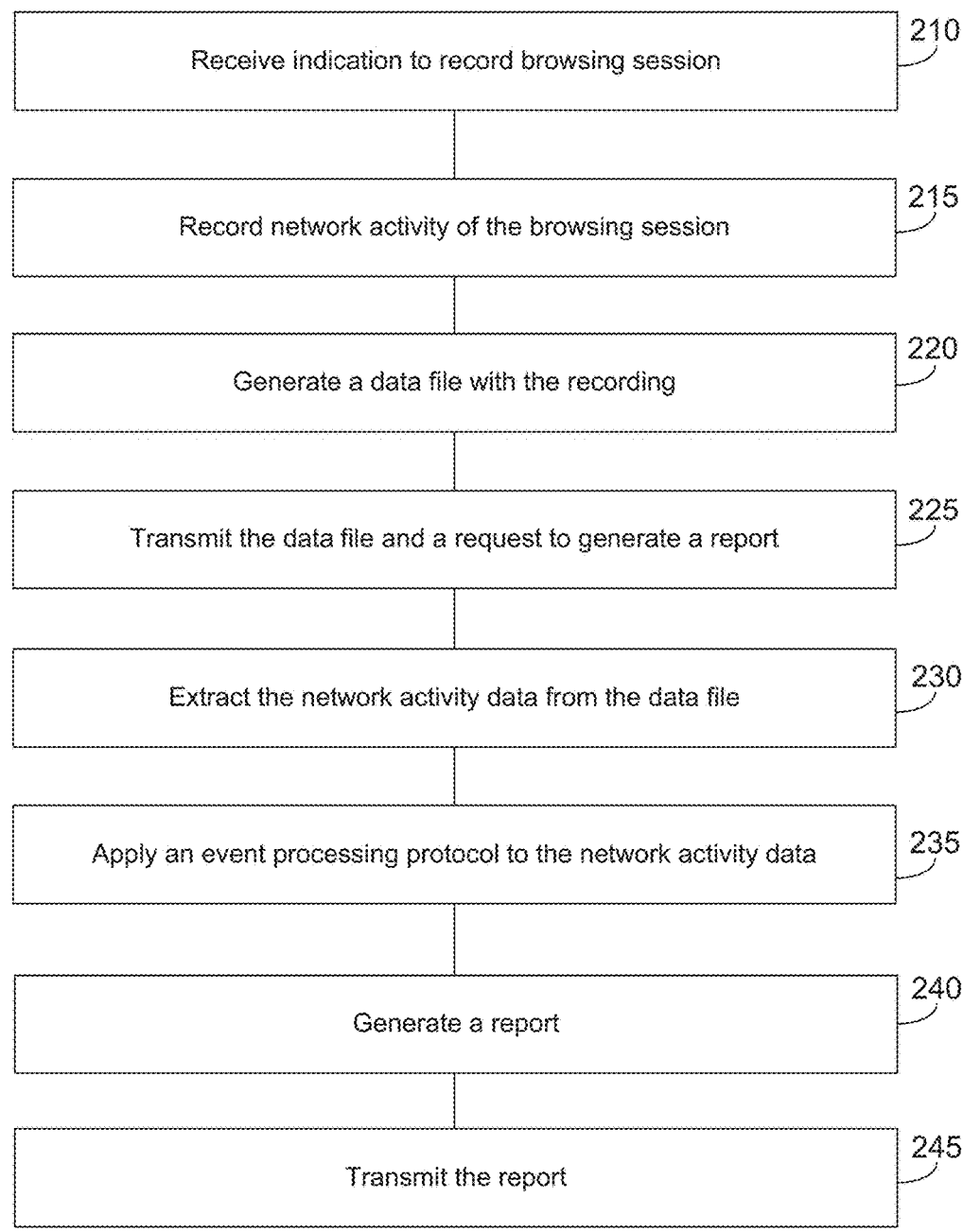
FIG. 2 depicts a method for configuring a resource for network traffic analysis in accordance with an implementation.

FIG. 2 illustrates a method 200 for configuration a resource (or website or web page) in accordance with an implementation. The method 200 can be performed by system 100, system 301, data processing system 120, computing system 700, or one or more component thereof. In some implementations, at 210 the method 200 can include an agent receiving an indication to record a browsing session. At 215, the agent can record network activity of the browsing session. At 220, the agent can generate a data file with the recording. At 225, the agent can transmit the data file and a request to generate a report. At 230, an analytics server receives the request and extracts the network activity data from the data file. At 235, the analytics server applies an event processing protocol to the network activity data. At 240, the analytics server generates a report. At 245, the analytics server transmits the report.

Still referring to FIG. 2, and in further detail, the agent receives an indication to record a browsing session at 210. The agent can include a web browser extension executed by one or more processors of a client device or computing device. The agent can receive the indication via a user interface of the client device. The agent can receive the indication via one or more buttons, prompts, widgets or other graphical user interface elements provided via the agent or web browser.

At 215, the agent can record network activity data of the browsing session. The browsing session can include accessing multiple web pages. The multiple web pages may correspond to a same web site or web sites operated by different entities, such as a third party website. The multiple web pages can correspond to multiple web sites operated by a same entity. The agent can record objects loaded by the web browser during the browsing session. Objects can be loaded responsive to browsing activity or network activity or interactions via input/output from client device. The agent can record events or hits triggered by tags embedded in at least one of the multiple web pages. For example, the content provider or publisher's webpage may include tags, whereas a third party payment processor's webpage may not include tags accessible by the user. The agent can record events or hits triggered by tags on a private web page, a webpage behind a firewall, a webpage that has not gone public or is not live. Thus, the agent can record a representation of the multiple webpages and the hits or events of the browsing session, wherein the hits or events include interactions, redirects, clicks, conversions, ecommerce, etc.

At 220, the agent can generate a data file with the recording of the network activity data. The data file can be in a format such as HAR. The agent may compress the data file for transmission. The agent can transmit the data file at 225. The agent can also provide a request to generate a report. In some cases, the request can include the data file. In some cases, the request may be separate from transmission of the data file.

In some implementations, the agent establishes a communications channel with the analytics server prior to transmission. The agent can request authorization to access the analytics server. The analytics server may request authentication credentials. The agent can provide the credentials and the analytics server can perform authentication. Responsive to successful authentication, the analytics server or agent can establish a communication channel between the agent and server. The agent can transmit the data file via the established, secure communication channel over a network.

In some implementations, the agent can perform preprocessing of the network activity data of the browsing session prior to transmitting the data file to the analytics server. For example, the agent can compare parameters, fields or other instructions or code associated with a tag embedded on the web page (e.g., JavaScript tag, tag data structure, etc.) with a predetermined template. For example, the template may include 4 fields and the agent can compare the number, order, or type of fields in the tag embedded on the webpage with the template to determine a match (e.g., a same number, same types, field names, parameters, structure, etc.). In some instances, the agent can check to see if a tracking identifier or tracking code field is properly configured with the tag. The tracking code or identifier may correspond to an account identifier of the tag embedded on the web page. Thus, the agent can perform preprocessing of the network activity of the browsing session prior to transmitting the data file to the analytics server.

At 230, the analytics server receives the request and extracts the network activity data from the data file. The analytics server can include a front end or back end to perform analytics. For example, a front end of the analytics server can receive the data file, extract or parse components of the data file. The front end can perform initial processing to identify tracking identifiers or otherwise convert or transform the data in a format for the back end.

At 235, the analytics server applies an event processing protocol to the network activity data. For example, the back end can apply a sessionization protocol to identify one or more sessions of the browsing session. The sessionization protocol can include identifying one or more tracking identifier and a duration and applying a heuristic technique or predetermined duration threshold or time interval threshold to network activity to identify a session. For example, the analytics server can determine there was network activity for 15 minutes on a website and then identify a first session. The analytics server may then determine there was network inactivity for 30 minutes, which was followed by additional network activity for 15 minutes. Thus, the analytics server may determine the subsequent 15 minutes of network activity separated from the first 15 minutes of network activity by 30 minutes of inactivity corresponds to a second network activity session.

In some implementations, the analytics server can determine or detect, using the event processing protocol, that a conversion or a transaction occurred. The analytics server can apply the event processing protocol to determine that a conversion occurred and a transaction occurred via a third-party payment processor. For example, the event processing protocol may be configured to identify a conversion goal corresponding to a tag with a source page named "add to cart", a second tag associated with a "checkout" button, and a third tag associated with a confirmation web page that is triggered responsive to a page view. Thus, by application of this event processing protocol to network activity data, the analytics server can identify a conversion or a transaction via a third party payment processor and generate a report to include an indication of a conversion and a transaction via a third-party payment processor.

At 240, the analytics server generates a report. The report can be generated responsive to application of the network activity protocol. For example, the report can indicate the number of sessions identified in the network activity data, a duration of the sessions, URLs accessed during the session, hits during the session, conversions during the session, errors, alerts or warnings associated with tags triggered during the session, etc.

In some cases, the report can include data for only a single browsing session associated with the client device executing the agent that records the network activity data. The report can only include data from tags triggered by webpage behind a firewall, or on a private network, or a webpage that has not gone public or live yet (e.g., a webpage still in development). The report can include information from only a browsing session recorded via an agent (e.g., extension of the web browser) executed by the client device.

At 245, the analytics server transmits the report for display via a display device of the client device. The report can be provided using various formats or rendering techniques. In some cases, the analytics server (or front end) can render the report and provide the rendered data for display on the client device (e.g., via agent or web browser). In some cases, the analytics server can provide the report data for rendering by the client device (e.g., as JavaScript objects).

Figure 3:
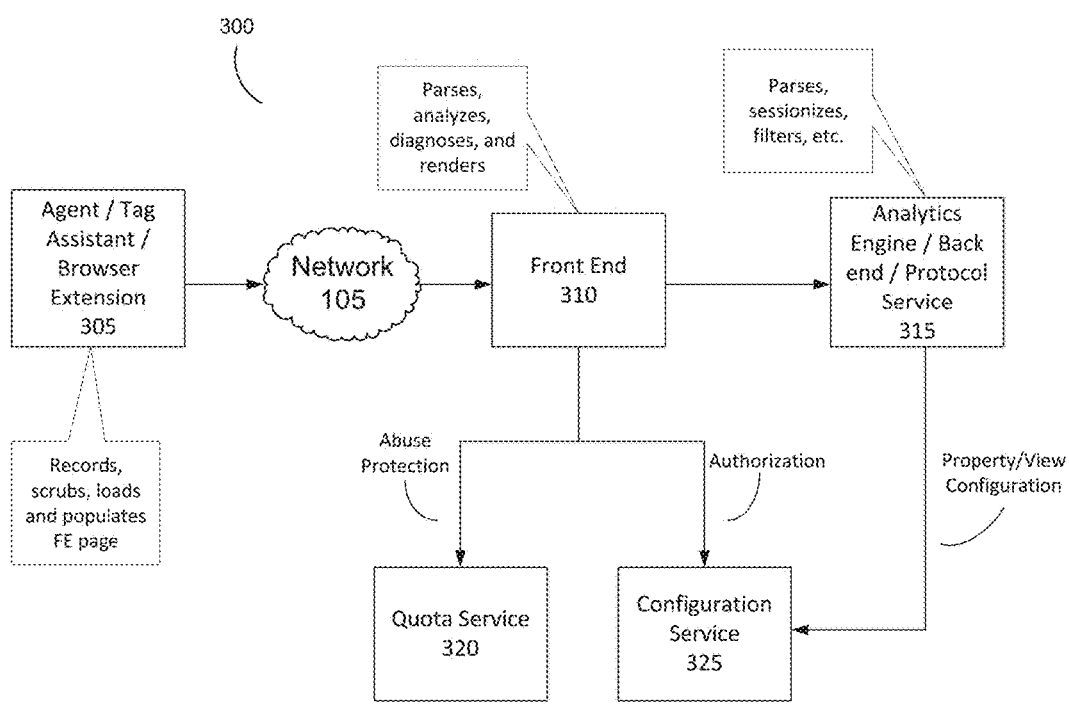
FIG. 3 depicts an operational block diagram of a system to configure a resource for network traffic analysis in accordance with an implementation.

FIG. 3 depicts an operational block diagram of a system 300 to configure a resource for network traffic analysis in accordance with an implementation. The system 300 can include one or more component or functionality of system 100. The agent 305 can include a web browser extension, such as a web browser plug-in or add-on. The front end 310, analytics engine 315, quota service 320 and configuration service 325 can reside or execute on one or more processors or memory of a data processing system, such as data processing system 120 or one or more servers, such as an analytics server.

The agent 305, front end 310, analytics engine 315, quota service 320 and configuration service 325 can each include at least one processing unit or other logic device such as programmable logic array engine, or module. The front end 310, analytics engine 315, quota service 320 and configuration service 325 can be separate components, a single component, or part of a data processing system (e.g., data processing system 120). The system 300 and its components, such as a data processing system, may include hardware elements, such as one or more processors, logic devices, or circuits.

The system 300 can include an agent 305. The agent 305 can be configured on a computing device. The agent 305 can include a tag assistant or a browser extension. The agent 305 can record network activity data. The agent 305 can scrub the recorded data. The agent 305 can load and populate a front end interface of an analytics server by transmitting the recorded data (e.g., in HAR data file) via network 105. The agent 305 can include one or more component or functionality of agent 130.

In some implementations, the agent 305 can record a multi-page session (flow) with respect to page loads and all interactions. The agent 305 can provide the recorded data for display on a computing device to allow users to review the recorded data. The agent can allow users to send the data for analysis to the front end 310 via network 105. The agent 305 can also receive and display the report generated by the analytics server.

In an illustrative example, the agent 305 receives an indication or a request for a report. The agent 305 then transmits a request to the front end 310 to verify that the agent 305 (or computing device or user thereof) is logged into an analytics account corresponding to the front end 310. If so, the agent 305 can load an iframe (e.g., inline frame such as an HTML document embedded within or inside another HTML document on a website) with an empty report from the front end 310. This report contains a <textarea> element. The agent 305 can fill this textarea with the HAR, and then find the "submit" button on the web page and emulate a click.

The system 300 can include a front end 310. The front end 310 can include one or more component or functionality of front end interface 135. The front end 310 (or 135) can include a communication port to communicate over network 105. The front end 310 can include hardware or software to render content such as server-side JavaScript content. The front end 310 can accept requests from the agent 305, invoke the analytics engine 315 to parse and sessionize the hits, then run diagnostics on this data, and finally return a rendered response or report for display on a computing device.

The front end 310 can serve a webpage configured to receive packets carrying data indicating the recorded browsing session. The webpage can receive the recorded browsing session via a recorded data file in a file format, or via an input text box. The front end 310 can be further configured to receive an IP address. The IP address can be used to simulate a location from which network activity is coming. By simulating an IP address or location for network activity, the system can apply IP-filters when performing analytics to test whether the IP filters working as intended or are susceptible to circumvention.

The front end 310 can further provide various levels of access, such as a normal user (e.g., a content provider, content publisher, or computing device), or a support technician of the system. Different levels may provide access to different properties and views. In some implementations, the front end 310 can be further configured to parse the received data to extract raw hits. The front end 310 can send the extracted hits to an analytics engine with a list of authorized properties and views. The front end 310 can receive session information from the analytics engine 315 and combine the raw hits data with the parsed hits and sessionized information to generate a model. The front end 310 can further render the model in the web browser executing on the client device associated with the agent 305.

The front end 310 can receive a request from the agent 305 for an analytics report. The front end 310 can access configuration service 325 to authenticate the agent 305 and determine a level of access or which identifiers the agent 305 is authorized to view. For example, the agent 305 may only be authorized to view a report for identifiers associated with the agent 305. The front end 310 can then parse the HAR and extract the raw hits from the request.

With the extracted raw hits, the front end 310 can create a request to the analytics engine 315 (or back end) that includes, for example: 91) raw hits; authentication level; and authorized identifiers. The front end 310 can receive a response from the analytics engine 315 with sessionization information, and verify that the response does not contain any data that is tied to properties or views to which the user does not have access.

The front end 310 can create a model of the recorded browsing session (or flow or journey) using the data from the response and from the parsed HAR. The front end 310 can run diagnostics on this model and render a report based on the model and diagnostics results. For example, the model representation can include: ModelRecording (represents the journey and is the main entry point); ModelPage (represents a page the user visited); ModelHit (represents a hit sent from a page); ModelProfileHit (represents a hit captured in a view); ModelProfileSession (represents a session with associated captured ModelProfileHit-s); ModelProperty (a wrapper around a Config Service object representing a property); and ModelProfile (a wrapper around a Config Service object representing a view).

The front end 310 can run one or more diagnostics including, e.g., detect a page that did not send a hit, detect dropped tracking identifiers, outdated protocol, missing tracking code, missing e-commerce data, clicks and visits discrepancies, goal conversion irregularities, improper tagging, improper filter implementation, or other warnings, alerts or errors related to the browsing session or resource configuration. In some implementations, to perform diagnostics, the front end 310 can be configured with an inspector for each type of diagnosis. The front end 310 can invoke a corresponding inspector on the model, which may create errors or warnings including localizable strings that can be rendered in the browser.

In some implementations, the front end 310 can include an aggregator configured to operate on the model to generate overall numbers, such as number of events rolled up by category, number of pageview hits for each URL, Entry and exit URL for a session, campaign information for a session, goals/conversions for a session, custom dimensions with session scope. Custom dimensions can refer to a custom descriptive attribute or characteristic of data. Examples of default dimensions include Browser, Landing Page and Campaign. Other examples of dimensions include Browser, Exit Page, Screens, or Session Duration. Dimensions such as Latitude, Longitude, or City Name can be used for a geographic location. A dimension can have a value. For example, the dimension City Name can include a value such as San Francisco, Berlin, or Singapore.

In some implementations, the front end 310 accesses a quota service 320 to protect against abuse or over loading of the back end 315. The quota service 320 can include a profile or protocol to limit the number of tags or hits for a website. The tags can be limited based on property or per session. For example, the quota service 320 may set a limit of a predetermined number of hits (e.g., 250, 500, 1000, 750, etc.) during a session, predetermined number of hits (e.g., 500, 1000, 2000, 10,000, 100,000, 200,000, etc.) per analytics account during a predetermined time interval (e.g., 12 hours, 24 hours, 48 hours, 72 hours, week, etc.). Additional limits can be based on timing of hits, such as a maximum number of timing hits processed per property per day (or set as a percentage of total number of pageviews processed for that property).

The system 300 can include an analytics engine 315. The analytics engine 315 can include a back end or a protocol service. A protocol service (or protocol buffer) may refer to technique for serializing structured data that facilitates allowing components to interface or communicate with each other and store structured information. The protocol service can include an interface description language that describes the structure of data and a program that generates source code from that description for generating or parsing a stream of bytes that represent the structured data. The protocol service can be implemented in a computer programming language or scripting language such as, e.g., C++, Java, Python, JavaScript, Go, PHP, Ruby, Perl, Scala, or Visual Basic.

The protocol service of the analytics engine can receive a collection of hits and the views extracted from the data file. For each hit (e.g., a string representing the hit URL), the analytics engine 315 can return details or information related to hit processing. If the user has access to the views of the property, the backend can also return web property hits for each property.

In some implementations, the analytics engine 315 may not write data to data storage. Rather, the analytics engine 315 can read configuration from the Configuration Service 325, without reading data from other data sources. Therefore, in some implementations, the sessionizer of the analytics engine 315 may not take any history of a visitor into account. Each request can be processed as if it were the very first time that visitor sent any network traffic.

The analytics engine 315 can process a request that includes raw hits and view identifiers the user has access to as follows: (1) hit parsing; (2) perform a lookup for materialized views (structured views) in the configuration service 325; and (3) sessionization. The analytics engine 315 can parse the raw hit (e.g., a string) to identify a tracking identifier and a view identifier for each hit. In some implementations, the analytics engine 315 can access the configuration service to obtain the materialized views (e.g., a database object that contains the results of the query) that can include the tracking identifier or view identifier.

A tracking identifier (or tracking ID) can include a string such as UA-000000-01. The tracking ID can be included in tracking code of the tag to indicate to the analytics server which account and property to send data to. The tracking ID can be included in a JavaScript or other protocols. In one example, the first set of numbers (000000, in the example above) can refer to an account number, and the second set (-01) can refer to a specific property number associated with the account. A property can refer to a sub-component of an analytics account that determines which data is organized and stored together. A resource tagged with the same Property ID can be collected and stored together. A single property can be used to track one website or mobile application, or be a roll-up of the data from multiple sites or mobile applications.

A view identifier (or view ID) can refer to a type of reporting view that includes data about a subset of traffic with a user identifier. User ID views can include a set of cross device reports, which can provide tools you need to analyze how content is engaged on different devices over the course of multiple sessions.

To perform sessionization, the analytics engine 315 can organize the hits by tracking identifier. The analytics engine 315 may cross-reference the tracking ID with the viewer ID.

For hits with the same tracking identifier, the analytics engine 315 can create an instance of a session. The analytics engine 315 can further determine visitor lifetime information, which can include parameters such as visitor-scope custom dimensions, visitor namespace, experiments, dimension widening, first campaign, and acquisition visit.

Figure 6A:
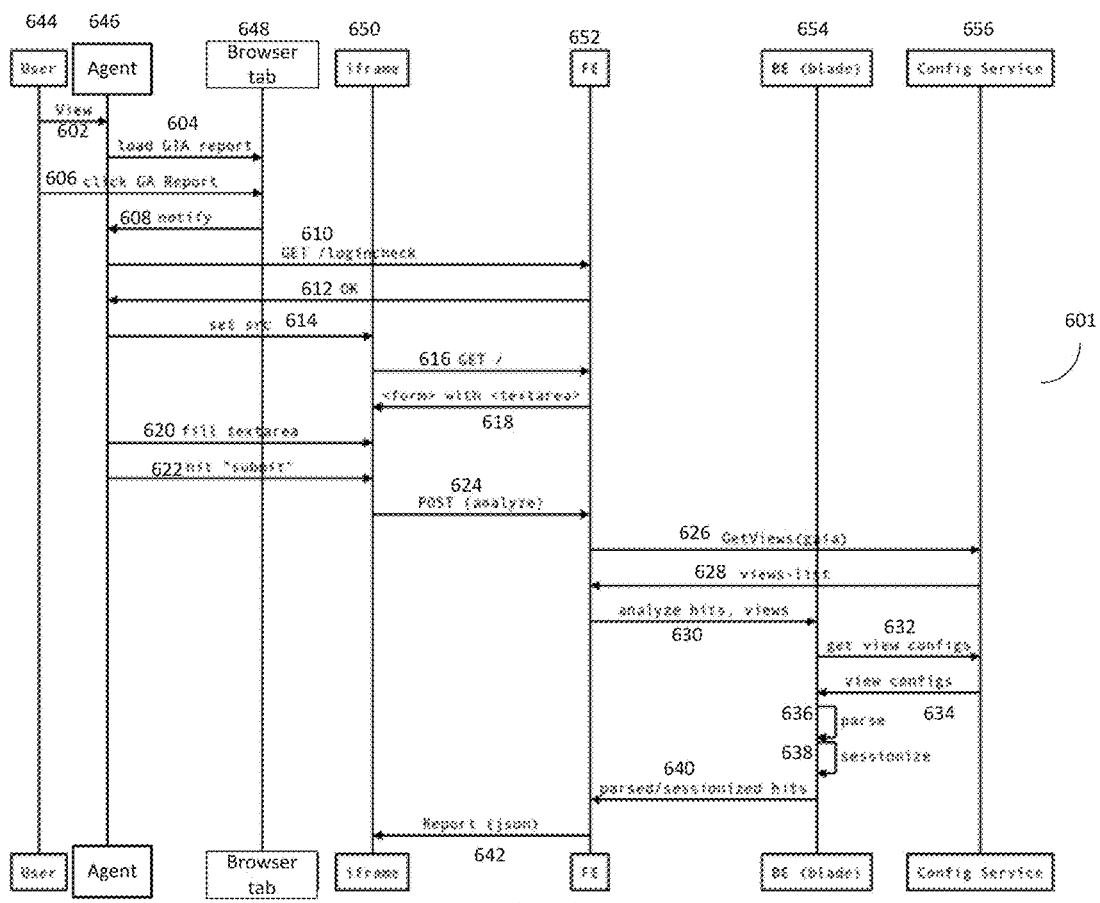
FIG. 6A depicts a functional flow diagram for generating a report with recorded network activity in accordance with an implementation.

FIG. 6A depicts a functional flow diagram 601 for generating a report with recorded network activity in accordance with an implementation. The user 604 can refer to a user of a computing device such as a web developer. The agent 646 can include agent 130 or 305 executed by a computing device 110. The browser tab 646 can include the web browser executed by computing device 110. The iframe 650 can refer to a component provided by a front end interface 135 or 310. The back end ("BE") 654 can include an analytics engine 140 or 315. The configuration service 656 can include configuration service 325.

At 602, a user 644 can provide an indication via a computing device or agent to view an analytics report. For example, the user may access a URL or website associated with the analytics report. At 604, the agent 646 conveys the request to load the report to the browser tab 646. At 606, the user can click a report button to request a report or access to a report. At 608, the browser tab can return a notification or prompt to the agent to request the agent 646 to confirm or verify authentication credentials. At 610, the agent 646 can send a request to the front end ("FE") 652 to verify that the user 644 is logged into an analytics account. If the request is approved (612), the agent 646 can set a source or location (e.g., IP address). At 614, the agent 646 can set the source and provide the source information to the iframe 650. At 616, the iframe can send a get request to the front end 652. At 618, the front end can return a form with a text area element. The agent 646 can fill the text area at 620 with the data file (e.g., in HAR format). The agent 646 can further emulate a click at 622 to submit the HAR data file to the iframe 650. At 624, the iframe 650 can initiate an analysis via the front end 652. At 626, the front end 652 can request authorized view identifiers from the configuration service 656. At 628, the configuration service 656 can respond with the requested list of authorized views and provide the list to the front end 652. At 630, the front end can analyze the hits and views and provide the results to the back end 654. At 632, the back end 654 gets a view configuration from the configuration service 656 that includes authorized configuration views, and the configuration service 656 returns the authorized configuration views at 634. At 636, the back end 654 parses the hits, and at 638 the back end 654 determines sessions for the hits (e.g., categorize the hits into sessions). At 640, the back end 654 returns the parses and sessionized hits to the front end 652. The front end can generate, create and render the report at 642 for display via iframe 650.

Figure 6B:
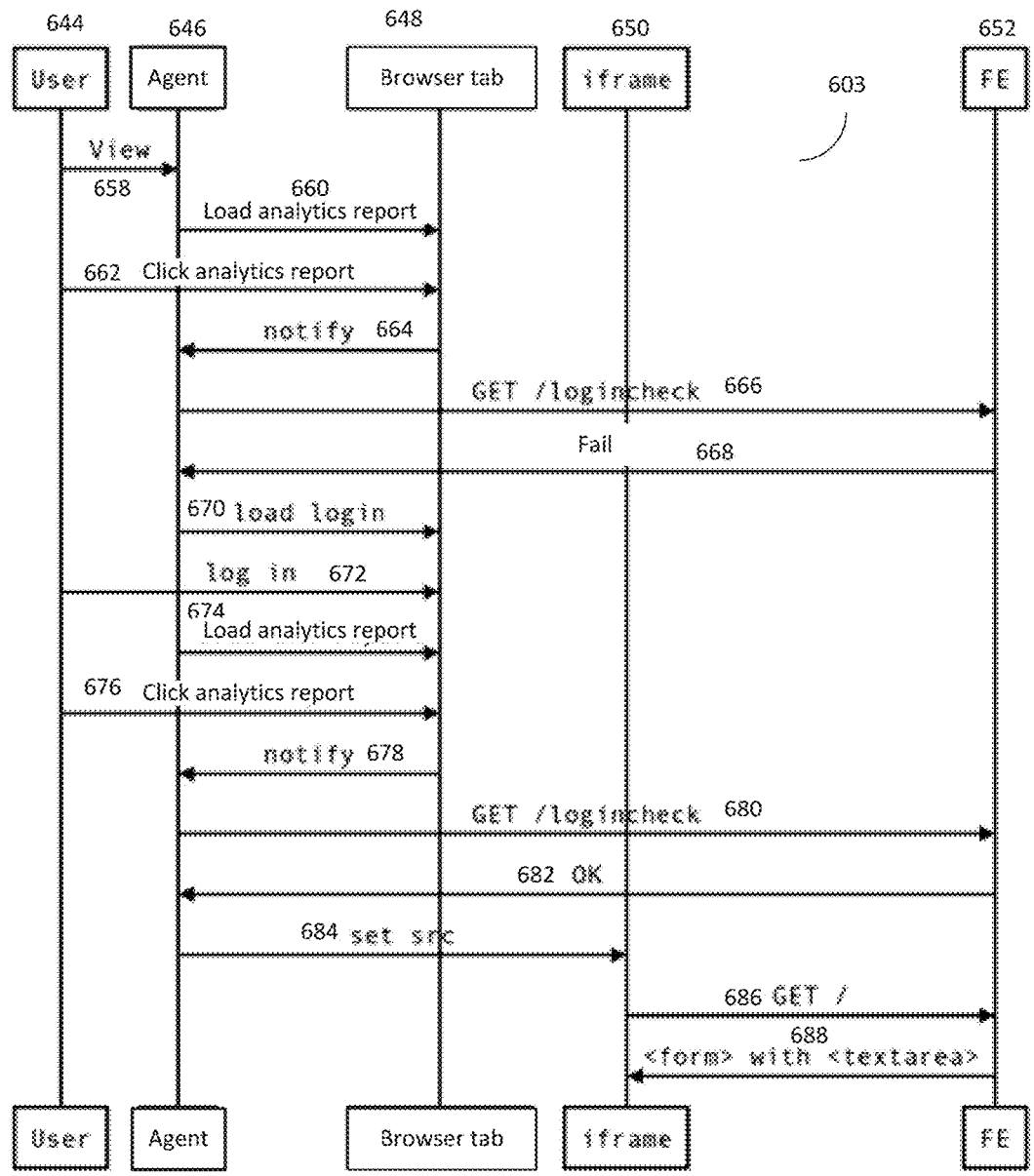
FIG. 6B depicts a functional flow diagram for generating a report with recorded network activity in accordance with an implementation.

FIG. 6B depicts a functional flow diagram 603 for generating a report with recorded network activity in accordance with an implementation. At 658, a user 644 can provide an indication via a computing device or agent to view an analytics report. At 660, the agent 646 can provide the indication to load the report to a browser tab 648. At 664, the browser tab can return a notification to agent 664 to initiate a login check to verify the agent is authenticated. At 666, the agent 646 initiates a login check with the front end 652 to get authenticated. At 668, the front end 652 indicates that the agent 646 failed the login check. At 670, the agent 646 can load a log in page in the browser tab 648, and at 672 the user can enter login credentials into the browser tab 648. At 674, the user again requests access or attempts to load an analytics report, clicks the report button at 676, and receives a notification from browser tab 678 to initiate authentication. The agent 646 requests a second logincheck from the front end 652 at 680. This time, the front end 652 returns a successful logincheck at 682. Thereafter, the flow is similar to flow 600 where the authentication is approved. For example, at 684, the agent sets a source IP, at 686 the iframe sends a get request to the front end for the upload interface, and at 688 the iframe receives the form with the text area in which to upload the HAR file.

Figure 7:
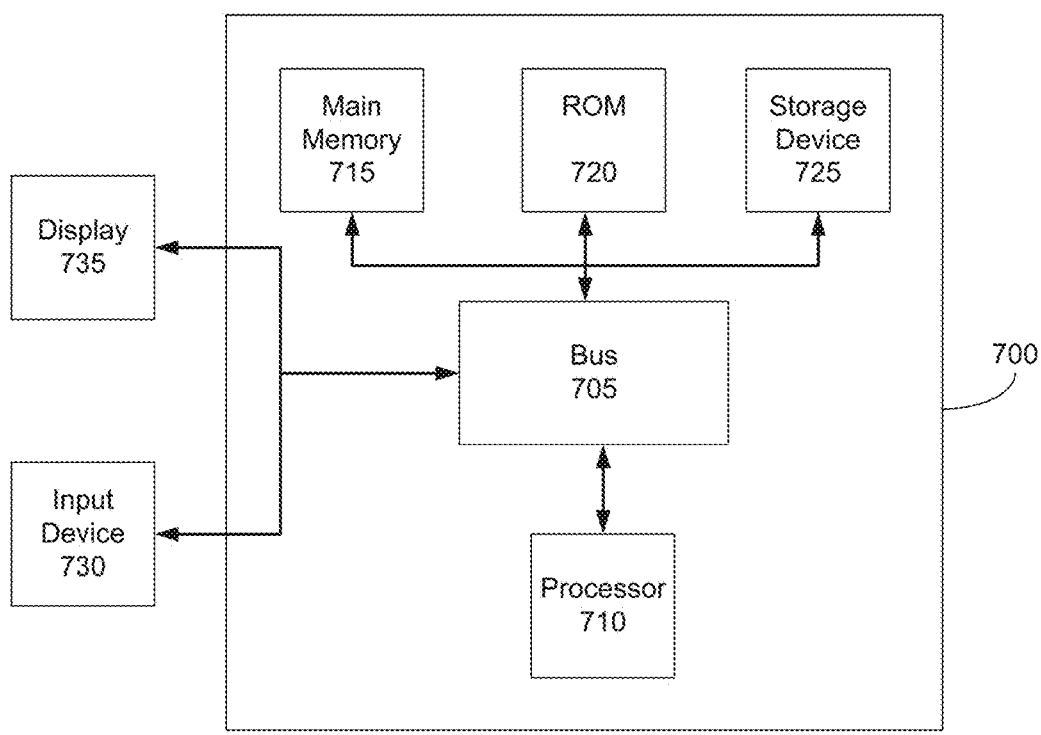
FIG. 7 is a block diagram illustrating a general architecture for a computer system that may be employed to implement various elements of the system shown in FIGS. 1 and 3, the interfaces shown in FIGS. 4-6, the method shown in FIG. 2, and the functional flow diagrams shown in FIGS. 6A-6B, among others, in accordance with an implementation.

Referring now to FIG. 7, a block diagram of a computer system 700 in accordance with an illustrative implementation is shown. The computer system or computing device 700 can be used to implement the system 100, system 300, content provider 125, computing device 110, content publisher 115, data processing system 120, front end interface 135, analytics engine 140, report generator 145, data repository 150, and agent 130. The computing system 700 includes a bus 705 or other communication component for communicating information and a processor 710 or processing circuit coupled to the bus 705 for processing information. The computing system 700 can also include one or more processors 710 or processing circuits coupled to the bus for processing information. The computing system 700 also includes main memory 715, such as a random access memory (RAM) or other dynamic storage device, coupled to the bus 705 for storing information, and instructions to be executed by the processor 710. Main memory 715 can also be used for storing position information, temporary variables, or other intermediate information during execution of instructions by the processor 710. The computing system 700 may further include a read only memory (ROM) 720 or other static storage device coupled to the bus 705 for storing static information and instructions for the processor 710. A storage device 725, such as a solid state device, magnetic disk or optical disk, is coupled to the bus 705 for persistently storing information and instructions.

The computing system 700 may be coupled via the bus 705 to a display 735, such as a liquid crystal display, or active matrix display, for displaying information to a user. An input device 730, such as a keyboard including alphanumeric and other keys, may be coupled to the bus 705 for communicating information and command selections to the processor 710. The input device 730 can include a touch screen display 735. The input device 730 can also include a cursor control, such as a mouse, a trackball, or cursor direction keys, for communicating direction information and command selections to the processor 710 and for controlling cursor movement on the display 735.

The processes, systems and methods described herein can be implemented by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. In alternative implementations, hard-wired circuitry may be used in place of or in combination with software instructions to effect illustrative implementations. Thus, implementations are not limited to any specific combination of hardware circuitry and software.

Although an example computing system has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system to analyze traffic of a computing network, comprising:
   a data processing system comprising one or more processors configured to:
   establish a connection over a computing network with an agent executing via a web browser on a client device, the agent configured to:
   provide network activity data for a browsing session in which the client device accesses at least one of a plurality of webpages provided by a website publisher, the network activity data indicating events triggered by tags comprising tracking code embedded on the at least one of the plurality of webpages provided by the website publisher; and
   the data processing system further configured to:
   receive, from the agent via the connection over the computing network, the network activity data;
   receive a request to process the network activity data from the web browser of the client device;
   identify, responsive to the request to process the network activity data, the events from the network activity data;
   process, responsive to the request, the events from the network activity data;
   generate, responsive to the request to process the network activity data for the client device and processing of the events, a report indicating a validity of at least one of the tracking code or the processing of the events, the report generated using the events identified from the network activity data received from the agent on the client device; and
   transmit, via the computing network, the report for display via a display device.

2. The system of claim 1, wherein the data processing system is further configured to:
   receive the request to process the network activity data from a computing device of the website publisher; and
   process, based on an event processing protocol, the events from the network activity data.

3. The system of claim 1, wherein the data processing system is further configured to:
   receive the request to process the network activity data from the client device executing the agent.

4. The system of claim 1, wherein the data processing system is further configured to:
   receive a data file comprising the network activity data.

5. The system of claim 1, wherein the agent is further configured to:
prior to transmission of the network activity data to the data processing system, preprocess activity of the browsing session to identify one or more errors in the tracking code embedded on the at least one of the plurality of webpages provided by the website publisher.

6. The system of claim 1, wherein the tags include an event trigger based on a predefined variable.

7. The system of claim 1, wherein the data processing system comprises an analytics server.

8. The system of claim 1, wherein the events include redirects and interactions with an analytics server.

9. The system of claim 1, wherein the data processing system is further configured to:
generate the report with an alert indicating a dropped identifier of the client device.

10. The system of claim 1, wherein the data processing system is further configured to:
determine, from the network activity data of the browsing session identified from the network activity data, a conversion and a transaction via a third-party payment processor; and
generate the report to include an indication of the conversion and the transaction via the third-party payment processor.

11. A method of analyzing traffic over a computing network, comprising:
establishing, by a data processing system comprising one or more processors, a connection over a computing network with an agent executing via a web browser on a client device, the agent configured to:
provide network activity data for a browsing session in which the client device accesses at least one of a plurality of webpages provided by a website publisher, the network activity data indicating events triggered by tags comprising tracking code embedded on the at least one of the plurality of webpages provided by the website publisher;
receiving, by the data processing system from the agent via the connection over the computing network, the network activity data;
receiving a request to process the network activity data from the web browser of the client device;
identifying, by the data processing system responsive to the request to process the network activity data, the events from the network activity data;
processing, by the data processing system responsive to the request, the events from the network activity data;
generating, by the data processing system responsive to the request to process the network activity data for the client device and processing of the events, a report indicating a validity of at least one of the tracking code or the processing of the events, the report generated using the events identified from the network activity data received from the agent on the client device; and
transmitting, by the data processing system via the computing network, the report for display via a display device.

12. The method of claim 11, comprising:
receiving the request to process the network activity data from a computing device of the website publisher; and
processing the events from the network activity data using an event processing protocol.

13. The method of claim 11, comprising:
receiving the request to process the network activity data from the client device executing the agent.

14. The method of claim 11, comprising:
receiving, by the data processing system, a data file comprising the network activity data.

15. The method of claim 11, wherein the agent is further configured to:
prior to transmission of the network activity data to the data processing system, preprocess activity of the browsing session to identify one or more errors in the tracking code embedded on the at least one of the plurality of webpages provided by the website publisher.

16. The method of claim 11, wherein the tags include an event trigger based on a predefined variable.

17. The method of claim 11, wherein the data processing system comprises an analytics server.

18. The method of claim 11, wherein the events include redirects and interactions with an analytics server.

19. The method of claim 11, comprising:
generating the report with an alert indicating a dropped identifier of the client device.

20. The method of claim 11, comprising:
determining, from the network activity data of the browsing session identified from the network activity data, a conversion and a transaction via a third-party payment processor; and
generating the report to include an indication of the conversion and the transaction via the third-party payment processor.

* * * * *